United States Patent

Bravenec et al.

[11] Patent Number: 6,073,854
[45] Date of Patent: Jun. 13, 2000

[54] TELEPHONE CARD OR THE LIKE USING LENTICULAR LENS MATERIAL

[75] Inventors: Daniel W. Bravenec, Castle Rock, Colo.; Gary W. Marsh, Kopperl, Tex.

[73] Assignee: LTI Corporation, Castle Rock, Colo.

[21] Appl. No.: 09/082,579

[22] Filed: May 21, 1998

[51] Int. Cl.$^7$ ...................................................... G06K 19/00
[52] U.S. Cl. ........................................... 235/487; 235/488
[58] Field of Search ..................................... 235/488, 487, 235/380

[56] References Cited

U.S. PATENT DOCUMENTS

| | | | |
|---|---|---|---|
| 3,937,565 | 2/1976 | Alasia | 350/320 |
| 4,034,555 | 7/1977 | Rosenthal | 58/127 R |
| 4,754,128 | 6/1988 | Takeda et al. | 235/488 |
| 5,434,395 | 7/1995 | Storck et al. | 235/380 |
| 5,497,189 | 3/1996 | Aritake et al. | 348/51 |
| 5,695,346 | 12/1997 | Sekiguchi et al. | 434/365 |
| 5,732,148 | 3/1998 | Keagy et al. | 382/124 |
| 5,753,344 | 5/1998 | Jacobsen | 428/142 |
| 5,910,940 | 6/1999 | Guerra | 369/275.1 |

*Primary Examiner*—Karl D Frech
*Attorney, Agent, or Firm*—Polster, Lieder, Woodruff & Lucchesi L.C.

[57] ABSTRACT

A card (10) for use as a telephone authorization card or the like is comprised of a layer of a backing material (20) such as a stiff plastic material which has some pliability. A thin sheet lenticular lens material (12) has a flat surface (14) on which is printed selected interlaced images. On the other side of the lens material is formed a plurality of lenticules (16) through which the images are viewed. The flat side of the lenticular material is secured to one face (22) of the backing in a convenient manner. A cutting tool is now used to form an opening (32) in the outer face of the lenticules and a programmed microchip (30) is inserted in the opening and secured in place. On the outer face of the backing material a magnetic strip (40) containing magnetically encoded indicia is secured. The card is usable in a reader (R) which can scan the magnetic strip and read information from the microchip to allow the user to place a telephone call or conduct other transactions.

13 Claims, 1 Drawing Sheet

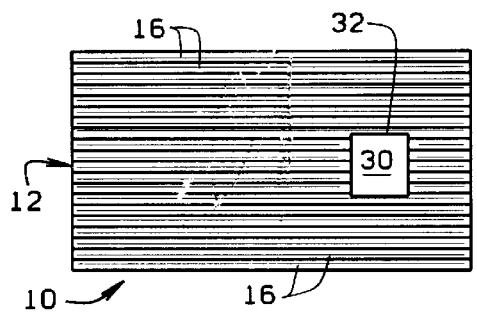
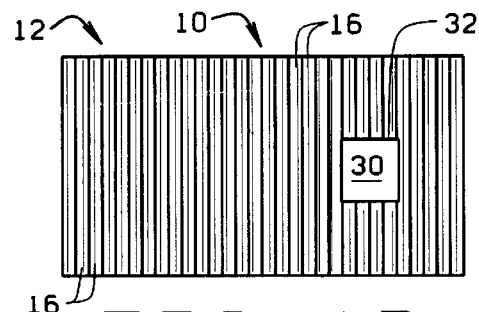
FIG.1A   FIG.1B
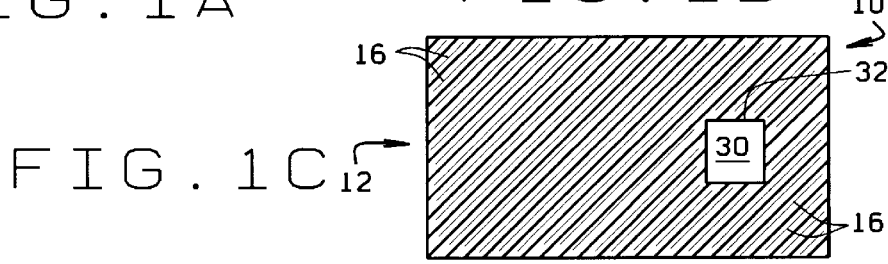
FIG.1C
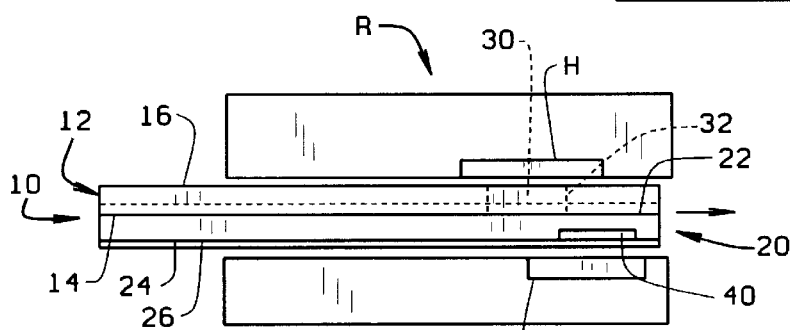
FIG.2
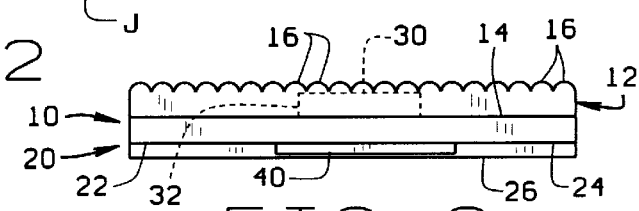
FIG.3
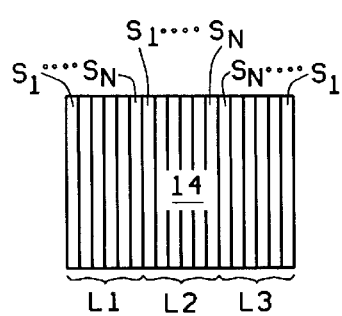
FIG.5
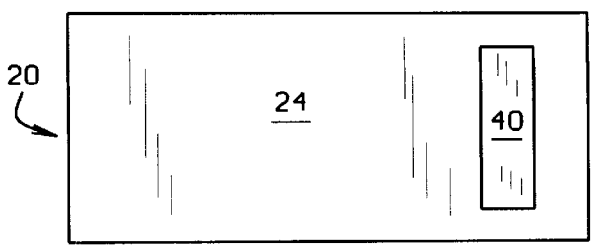
FIG.4

TELEPHONE CARD OR THE LIKE USING LENTICULAR LENS MATERIAL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to cards such as telephone calling cards, credit and debit cards and the like, and more particularly, to such cards manufactured using a lenticular lens material.

Lenticular lenses and lenticular lens materials have a wide variety of uses, particularly for advertising purposes. Heretofore, the material has been used on cereal boxes and other packaging to promote movies, for example. As is well-known in the art, one of the advantages of using lenticular lenses is that it can be used to provide a variety of visual effects which are created as the lens material is viewed from different angles.

It is becoming more and more common for people to use cards not only for charging a purchase on credit, but also to debit an account, obtain funds from an automatic teller machine (ATM), place long distance telephone calls, etc. These cards, all of which are about the same size as a conventional credit card, are used at points of purchase, inserted in an ATM, or inserted into a reader on a telephone. The card includes a microchip having authorization information, account numbers, and other information which, when accepted, allows the user to complete an appropriate transaction. The use lenticular lens material is also known. Recently, a thin sheet lenticular lens material has been developed which has features which, when combined with current card technology provides certain advantages over conventional cards now in use.

BRIEF SUMMARY OF THE INVENTION

Among the several objects of the present invention may be noted the provision of a card such as a telephone card, credit card, debit card, ATM card and the like made with the use of a lenticular lens material;

the provision of such a card made with the use of a thin film lenticular lens material so the resulting thickness of the card is compatible with that of conventional cards so the card is usable in the various readers provided for the respective types of cards;

the provision of such a card in which interlaced image segments are printed on one side of the lenticular material, different images being seen through the material when the face of the card is subsequently viewed by a user;

the provision of such a card which is a laminated card having a backing material to which the lenticular material is secured, a magnetic strip or the like being attached to the opposite side of the backing material to which the lenticular material is secured;

the provision of such a card in which an opening is formed in the lenticular material for attaching a machine readable microchip to the material; and, the provision of such a card in which use of the printed lentcular material provides an attractive presentation to the company sponsoring the card and a user thereof.

In accordance with the invention, generally stated, a card for use as a telephone authorization card or the like is comprised of a layer of a backing material such as a stiff plastic material which has some pliability. A thin sheet lenticular lens material has a flat surface on which is printed selected interlaced images. On the other side of the lens material is formed a plurality of lenticules through which the images are viewed. The flat side of the lenticular material is secured to one face of the backing in a convenient manner. A cutting tool is now used to form an opening in the outer face of the lenticules and a programmed microchip is inserted in the opening and secured in place. On the outer face of the backing material a magnetic strip containing magnetically encoded indicia is secured. The card is usable in a reader which can scan the magnetic strip and read information from the microchip to allow the user to place a telephone call or conduct other transactions. Other objects and features will be in part apparent and in part pointed out hereinafter.

BRIEF DESCRIPTION OF THE SEVERAL VIEWS OF THE DRAWINGS

In the drawings,

FIGS. 1A–1C are respective top plan views of a card of the present invention which lenticules of a sheet of lenticular material forming the card extend parallel to a longitudinal axis of the card (FIG. 1A), perpendicular to the longitudinal axis (FIG. 1B), or at an angle to the longitudinal axis (FIG. 1C);

FIG. 2 is a side elevational view of the card as inserted in a reader for reading information stored on the card;

FIG. 3 is an end elevational view of the card;

FIG. 4 is a bottom plan view of the card; and,

FIG. 5 illustrates interlaced image segments printed on the lenticular material.

Corresponding reference characters indicate corresponding parts throughout the drawings.

DETAILED DESCRIPTION OF THE INVENTION

Referring to the drawings, a card indicated generally 10 in FIG. 1 is for use by a customer to authorize use of a telephone. Or, card 10 can be a debit card or a credit card all keeping within the scope of the invention. Card 10 first comprises a thin sheet 12 of a transparent lenticular lens material. Sheet 12 has a thickness of, for example, 10–17 mils. One side 14 of the sheet is flat. One the other side of the sheet a plurality of lenticules 16 are formed. There may be between 80–140 lenticules per inch formed on sheet 12. As shown in FIG. 5, interlaced image segments $S_1$–$S_n$ are printed on flat side 14 of the sheet in any suitable manner. The method of printing forms no part of this invention. Also as shown in FIG. 5, the interlaced image segments are subtended by respective lenticules L1, L2, L3, etc. Many different types of information can be conveyed by the interlaced image segments with different information being observable by a viewer viewing the sheet from a different angle. Among the types of information are the name of the card issuer, an issuer telephone number, instructions for using the card as, for example, an arrow indicating which end of the card should be inserted in a reader R.

Sheet 12 is secured to a backing material 20 in any suitable manner including use of an adhesive, heat bonding, chemical bonding, etc. Sheet 12 is secured to the material with flat side 14 of the sheet being secured to a mating surface 22 of the backing material. As shown in FIGS. 1A–1C, sheet 12 can be secured to sheet 20 with sheet 12 cut so the lenticules form different patterns. Thus, in FIG. 1A, sheet 12 is attached so the lenticules 16, which are formed in a side-by-side parallel arrangement and extend the length of the sheet of lenticular material, extend lengthwise of the card. In FIG. 1B, sheet 12 is shown as being cut and attached so the lenticules extend crosswise of the length of the card. And, as shown in FIG. 1C, the sheet is cut and attached so the lenticules extend diagonally of the card. Other arrangements may also be achievable without departing from the scope of the invention.

A microchip 30 is insertable in an opening 32 formed on the sheet and extending through the lenticules. The microchip is secured to surface 22 of backing 20 again, in any convenient manner. The microchip contains encoded information which allows the user to conduct a transaction when the card is inserted into reader R. The size of opening 30 corresponds to the dimensions of the microchip. Further, while the placement of the microchip is shown in the drawings as being toward one end of the card, the placement can be in any convenient location.

In addition to microchip 30, a magnetic strip 40 also containing encode user related information can be attached to the opposite side 24 of backing material 20. The magnetic strip is secured to this surface in the conventional manner. Also, this side of the backing material may be coated with a thin film layer 26 of a suitable lamination material to protect the magnetic strip. Alternatively, the magnetic strip can be affixed to the same side of the card as the microchip. In this instance, a second opening corresponding in size to that of the magnetic strip would be made in the lenticules 16 and the strip secured in place. Again, the strip would be coated with a thin film layer 26 to protect the strip.

In use, as shown in FIG. 2, card 10 is inserted in reader R. The reader includes a read head H which which is capable of accessing the encoded information on microchip 30 to enable the card user to conduct a transaction such as placing a telephone call. The reader may also include a second reader J which is capable of accessing information on magnetic strip 40, if the card carries a magnetic strip, for the same purpose.

What has been described is a telephone card or the like made with the use of a thin film lenticular lens material. This allows the resulting thickness of the card to be compatible with conventional cards of a similar type so the card is usable in a reader provided for such cards. Interlaced image segments are printed on one side of the lenticular material so different images are viewed through the lenses when the face of the is subsequently card angled one way or another. Each card is a laminated card having a backing material on which the lenticular material is mounted, and a magnetic strip is attached to the opposite side of the backing material. An opening is formed in the lenticular material for mounting a microchip containing relevant user information to the card. Use of the printed lentcular material provides an attractive presentation for the company sponsoring the card to a user thereof.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

SEQUENCE LISTING

Not applicable.

What is claimed is:

1. A card for use in telephone authorization comprising:

a sheet of a transparent lenticular lens material having a flat surface on which selected interlaced images are printed, said interlaced images comprising information in the form of words or graphical images or a combination thereof, a plurality of lenticules being formed on the other side of said sheet;

a backing material to which said flat side of said lenticular material is secured; and, a microchip insertable in an opening formed in said lenticules and secured in place therein, said card being scannable by a reader to access information on said microchip to allow the user to place a telephone call.

2. The card of claim 1 further including a magnetic strip mounted on said backing material on a side opposite that to which said lenticular lens material is attached, said magnetic strip containing magnetically encoded indicia also readable by said reader.

3. The card of claim 2 in which a second opening is formed in said lenticules and said magnetic strip is received in said opening.

4. The card of claim 1 which is rectangular in shape and said lenticular lens material is mounted to said backing material with said lenticules extending parallel to a longitudinal axis of said card.

5. The card of claim 1 which is rectangular in shape and said lenticular lens material is mounted to said backing material with said lenticules extending perpendicular to a longitudinal axis of said card.

6. The card of claim 1 which is rectangular in shape and said lenticular lens material is mounted to said backing material with said lenticules extending diagonally across said card.

7. The card of claim 1 wherein said sheet is 10–17 mils thick and there are between 80–140 lenticules per inch on formed on the sheet.

8. A credit card for use in conducting business transactions comprising:

a sheet of transparent lenticular lens material having a flat surface on which selected interlaced images are printed, said interlaced images comprising information in the form of words or graphical images or a combination thereof, a plurality of lenticules being formed on the other side of said sheet;

a backing material on which said flat side of said lenticular material is mounted;

a microchip insertable in an opening formed in said lenticules and secured in place therein; and, a magnetic strip mounted on said backing material on a side opposite that to which said lenticular lens material is mounted, said card being scannable by a reader to access information on said microchip and magnetic strip to allow a user of the card to conduct a transaction.

9. The card of claim 8 which is rectangular in shape and said lenticular lens material is mounted on said backing material with said lenticules extending at an angle to a longitudinal axis of said card.

10. The card of claim 9 wherein said lenticules extend parallel to said longitudinal axis.

11. The card of claim 9 wherein said lenticules extend perpendicular to said longitudinal axis.

12. The card of claim 9 wherein said lenticules extend diagonally across said card.

13. The card of claim 8 wherein a second opening is formed in said lenticules and said magnetic strip is received in said opening so to be mounted on said card on the same side as said microchip.

\* \* \* \* \*